(12) United States Patent
Badenhop et al.

(10) Patent No.: US 7,046,149 B1
(45) Date of Patent: May 16, 2006

(54) REAL-TIME SYSTEM FOR MONITORING THEFT PROTECTION

(75) Inventors: Wilhelm Badenhop, Hengelo (NL); Petrus Wilhelmus Maria Paijens, Lochem (NL)

(73) Assignee: N.V. Nederlandsche Apparatenfabriek NEDAP, DC Groenlo (NL)

( * ) Notice: Subject to any disclaimer, the term of this patent is extended or adjusted under 35 U.S.C. 154(b) by 0 days.

(21) Appl. No.: 10/110,140

(22) PCT Filed: Oct. 9, 2000

(86) PCT No.: PCT/NL00/00726

§ 371 (c)(1),
(2), (4) Date: Apr. 1, 2003

(87) PCT Pub. No.: WO01/27892

PCT Pub. Date: Apr. 19, 2001

(30) Foreign Application Priority Data

Oct. 8, 1999 (NL) .................................. 1013245

(51) Int. Cl.
*G08B 13/14* (2006.01)
(52) U.S. Cl. .................. 340/572.4; 705/18; 705/28
(58) Field of Classification Search ............ 340/572.1, 340/572.4, 5.92, 506; 705/16, 18, 22, 28; 235/375, 385
See application file for complete search history.

(56) References Cited

U.S. PATENT DOCUMENTS

| 4,636,950 A | 1/1987 | Caswell et al. ............. 364/403 |
| 4,972,504 A | 11/1990 | Daniel, Jr. ..................... 455/2 |
| 5,151,684 A | 9/1992 | Johnsen ....................... 340/572 |
| 5,745,036 A | 4/1998 | Clare ......................... 340/572 |

FOREIGN PATENT DOCUMENTS

| WO | 93/17404 | 9/1993 |
| WO | 95/30201 | 11/1995 |

*Primary Examiner*—Thomas Mullen
(74) *Attorney, Agent, or Firm*—Jacobson Holman PLLC

(57) ABSTRACT

A system including at least one theft security system having at least one transceiver device, set up adjacent at least one passage, for detecting antitheft labels that pass the passage, characterized in that each theft security system and/or each transceiver device is preferably provided with an identification code with which each theft security system and/or each transceiver device is identifiable within the system, the system further having at least one control device, and the system further having a communication device, the communication device being adapted for real-time transmission of real-time information about detected antitheft labels from each theft security system and/or each transceiver device to the control device, the control device being adapted for real-time processing of the real-time received real-time information.

17 Claims, 13 Drawing Sheets

Sourcetagging information

| Product code | Description | Required level | Actual level |
|---|---|---|---|
| 71632415 | Adidas shirt Agassi | 75% | 34% |
| 75485584 | Nike sportschoen Gullit | 100% | 12% |
| 87523593 | Lego Duplo electrische trein | 75% | 69% |
| 84879145 | Lego Technisch Star Wars | 70% | 31% |
| 45342229 | Portefeuille CCB 456 | 80% | 79% |
| 21443225 | Cross pen kado verpakking | 75% | 78% |
| 22456143 | Parker Pen "Millenium" | 90% | 61% |

Fig. 12

REAL-TIME SYSTEM FOR MONITORING THEFT PROTECTION

FIELD OF THE INVENTION

The invention relates to a system comprising at least one theft security system comprising at least one transceiver device, set up adjacent at least one passage, for detecting antitheft labels that pass the passage.

BACKGROUND OF THE INVENTION

Such a system is known per se. Such a system is often placed in stores, such as department stores, where customers themselves can take the merchandise to be purchased from the position where it is displayed to a checkout to pay for it. In such stores, it is possible to reach the exit of the store without visiting a checkout to check out the merchandise. It is therefore fairly easy to steal, since, when leaving the store, the merchandise can be inconspicuously taken along, for instance hidden in a bag, without being paid for. To be able to discover theft of merchandise, a number of articles are provided with antitheft labels. The antitheft labels are so designed that when passing a passage, in this case the exit, a transceiver device set up there can detect the antitheft label. When the transceiver device detects an antitheft label, an alarm goes off. The alarm can be a visible alarm, such as, for instance, a flashing or rotating light attracting attention, or an audible alarm, such as, for instance, a siren. A security officer is alerted by the alarm and will try to find the antitheft label that has been detected by the theft security system and proceed to stop a customer to prevent theft. When a customer checks out an article that is fitted with an antitheft label, the antitheft label, after payment, will be either removed from the article by the employee at the checkout, or be deactivated. The transceiver device can no longer detect the antitheft label then. The customer can leave the store without an alarm going off.

A disadvantage of such a system is that when employees at the checkout forget to remove the antitheft label from the article which has been paid for, or forget to deactivate the antitheft label of the article paid for, the alarm will go off, which will be embarrassing at the least to the customer. A security officer will then hasten to the customer to stop the customer. If this situation occurs frequently, this may eventually lead to loss of customers. Also, in such a situation, the customer is unnecessarily detained and it further means that the security officer cannot at that moment respond, for instance, to alarms going off elsewhere.

SUMMARY OF THE INVENTION

An object of the invention is to provide a system with which management can be provided with real-time information about the security system. The object set out is achieved with the system according to the invention which is characterized in that each theft security system and/or each transceiver device is preferably provided with an identification code with which each theft security system and/or each transceiver device is identifiable within the system, the system further including at least one control device, and the system further comprising a communication device, the communication device being arranged for real-time transmission of real-time information about detected antitheft labels from each theft security system and/or each transceiver device to the control device, the control device being arranged for real-time processing of the real-time received real-time information.

An advantage of the system according to the invention is that the management, through a control device, can be informed directly about the number of times, per predetermined period of time, that a theft security system produces an alarm. From practice, it has been found that the number of alarms produced by a theft security system can for a large part be traced back to detections of antitheft labels that are attached to articles which have been paid for. A relatively small proportion of the number of alarms given by a theft security system can be traced back to a detection of an antitheft label that is attached to an article which has not been paid for. When a predetermined threshold value for the relatively small number of alarms given by a theft security system that are traceable to detection of an antitheft label attached to an unpaid-for product is exceeded, management may ask itself whether an employee at a checkout has forgotten to remove the antitheft labels from paid-for articles or has forgotten to deactivate the label when the article was being paid for. Also, management may then wonder whether the device with which antitheft labels are deactivated has become defective. Management can take immediate action, for instance by sending a message to employees at checkout blocks from which it appears that a theft security system too often detects an antitheft label. The alertness of the coworkers as regards the removal of the antitheft label or the deactivation of the antitheft label when an article to which an antitheft label is attached is being checked out, will increase upon reception of such a message. When after some time the number of alarms given by the theft security system has not decreased, management can investigate further what the cause of this is. In that case, a wave of thefts may be involved, or a failing apparatus with which the antitheft labels are deactivated, or, for instance, a detection of antitheft labels attached to articles coming from another store.

A particular embodiment of the system according to the invention is characterized in that the system further comprises at least one person and/or goods registration device comprising at least one person registration system, set up adjacent at least one passage, for identifying and/or counting persons that pass the passage, and/or at least one checkout block for counting and/or identifying goods to be checked out by, for instance, scanning and optionally deactivating and removing antitheft labels attached to the goods, the communication device being further arranged for at least the real-time transmission of real-time information from each person and/or goods registration device and/or each person identification and/or registration system and/or each checkout block to at least one local control device and/or the central control device. This provides the advantage that a local control device and/or the central control device also has/have real-time disposal of real-time information concerning, for instance, the number of customers in a store. The attendant busyness may be a reason, for instance, to adjust the number of allowable alarms given by the theft security system. Also the number of registered goods, for instance at a checkout, can be known, through this system, to management monitoring a local control device and/or the central control device. It may be, for instance, that although the number of customers at a given time increases, the number of articles checked out at a checkout does not so much increase. In that case, alarms given by a theft security system may, indeed, be related to a wave of thefts, and not so much to the failure of employees at a checkout. With this embodiment, optionally, the coworker at a checkout can be identified. Articles can be counted at a checkout but can also be identified. A local control device can be arranged locally in the system, that is, for instance, within a branch in which the theft security system is disposed. However, the information generated by the system can also be transmitted real-time to a central control device accommodated remotely in the system. This central control device may be located, for instance, at a main office. At the central control device, information can be collected from various local control devices. By means of this system, for instance, a central control device at a main office in Amsterdam can be provided with real-time information about theft security systems in, for instance, London, Brussels, Paris, Madrid, etc.

A particular embodiment of the system according to the invention is characterized in that the system is further arranged for manual input and real-time transmission of information regarding antitheft labels attached to paid-for goods. This provides the advantage that when a security officer has established that a detection originates from an antitheft label attached to a paid-for article, at least one local control system and/or the central control system is provided with this information. Management can then immediately tailor the measures to be taken to this extra information.

A very special embodiment of the system according to the invention is characterized in that the system is further arranged for real-time transmission of real-time information about systems and/or devices detected as being defective. This provides the advantage that when, for instance, the customer counting system fails, management does not need to waste time on the question why, for instance, nonetheless products are being scanned at the checkout.

A very special embodiment of the system according to the invention is characterized in that the at least one local control unit and/or the central control unit are arranged to control each theft security system and/or each transceiver device real-time. This provides the advantage that management, for instance after having studied the information provided by the control device, is able to switch off a theft security system. There may be a reason to do so, for instance, when it has been found that the deactivation device does not function.

A very special embodiment of the system according to the invention is characterized in that each local control unit and/or the central control unit is provided with analysis and/or statistic processing programs. This provides the advantage that the control units are capable of processing the real-time received real-time information, of analyzing same and, for instance, of providing same with uncertainty intervals, which reduces the risk of a wrong choice from the measures to be taken.

A special embodiment of the system according to the invention is characterized in that each local control unit and/or the central control unit is provided with software programs to process information coming from a group of systems and/or devices. This provides the advantage that management can optionally group information from selected systems and/or devices. The differences and/or similarities of information coming from different groups of devices and/or system can in this way be simply looked at. Thus, for instance, the number of theft alarms going off can be looked at in combination with the number of visiting and buying customers. Also, differences per location can be mapped.

As indicated earlier, the central control device can be disposed remote from the local control device. As a result, it is possible for diagnostic real-time information to be obtained remotely and real-time from the at least one device. It is also possible to provide remote, real-time service by modifying settings of the device and/or operating the device remotely. In addition, it is possible to remotely obtain real-time information about the scanned goods such as the amount of goods which have been scanned, what goods have been scanned, the time when the goods in question were scanned, etc. Also, remotely, real-time information can be obtained about the detected antitheft labels. This information can again concern the number of detected labels, the time at which the labels were detected, the type of label that was detected, etc. In this way, connections can be made between scanned goods whose labels have not been deactivated or removed, goods whose labels have been deactivated or removed but which have not been scanned, etc.

The invention further relates to a system comprising at least one person and/or goods registration device such as a theft security system comprising at least one transceiver device, set up at a passage, for detecting antitheft labels that pass the passage, a person identification and/or registration system, set up at a passage, for registering or identifying persons who pass the passage and/or a checkout block for registering goods to be checked out by, for instance, scanning, and optionally deactivating or removing antitheft labels attached to the goods, characterized in that the at least one device is connected with a local control device for providing a communication connection between the at least one device and the local control device, the system further comprising a central control device which is connected with the local control device for exchanging data between the local control device and the central control device, the system being adapted for transmitting from the local control device to the central control device diagnostic information about the operation of the at least one device, for transmitting from the local control device to the central control device information about detected antitheft labels, for transmitting from the local control device to the central control device information about the registered goods, for transmitting from the local control device to the central control device information about the registered or identified persons and/or for transmitting from the central control device to the local control device information for changing settings of the at least one device and/or operating the at least one device.

BRIEF DESCRIPTION OF THE DRAWINGS

In order to obtain a better and more complete insight into the possibilities of the system according to the invention, all will be further elucidated with reference to the drawing. In the drawing:

FIGS. 2 to 12 respectively show screen layout of a display of the central control device of the system according to FIG. 1.

DETAILED DESCRIPTION OF THE PREFERRED EMBODIMENTS

Figure 1A:
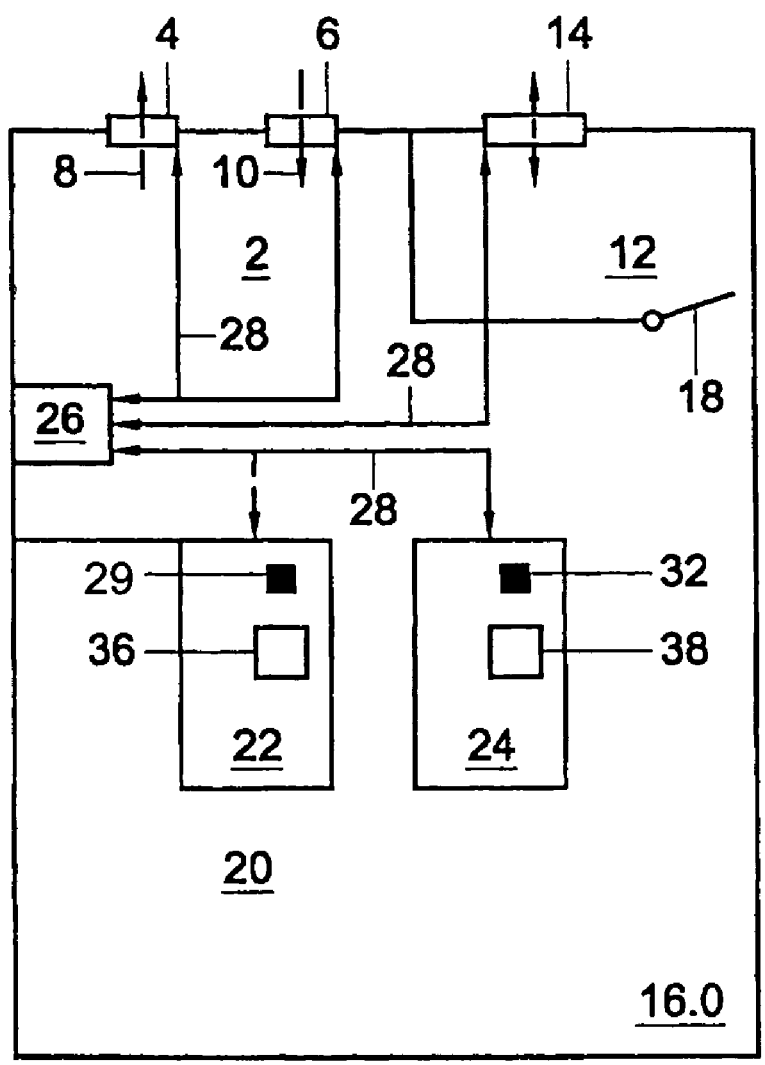
FIG. 1a schematically shows a first possible embodiment of a system according to the invention.

In FIG. 1a a first embodiment of a system according to the invention is shown. This system comprises multiple registration devices.

This involves both person registration devices and goods registration devices. More particularly, the system comprises a theft security system 2 which is provided with two transceiver devices 4, 6, disposed at two passages, respectively. The transceiver devices 4, 6 are each of a type known per se, for detecting antitheft labels which in this example pass the passages 8, 10.

Further, the system comprises a person registration device in the form of a person identification and/or registration system 14, known per se, disposed at a passage 12, for registering or identifying persons who pass the passage 12. In this example, the passages 8 and 10 are passages of a store 16.0, via which customers can enter and leave the store. In this example, the passage 12 is a passage for the personnel of the store 16.0. Accordingly, the person identification system 14 is intended for registering the times when identified employees enter the store and leave it again through passage 12. The passage 12 can be closed off from shopping space 20 by a door 18.

The system further comprises two checkout blocks 22,24, known per se, which are each provided with a device 36,38, respectively, for scanning goods to be checked out, and with deactivation devices 29,32, respectively, for deactivating antitheft labels that may be attached to the goods. All registration devices, such as the person and goods registration systems, can be provided with identification codes, with which the devices and systems mentioned are identifiable within the system.

The system of the store 16.0 further comprises a local control device 26 which is connected via the communication device 28 with the antitheft system 4, the person identification system 14 and the checkout blocks 22,24.

Figure 1B:
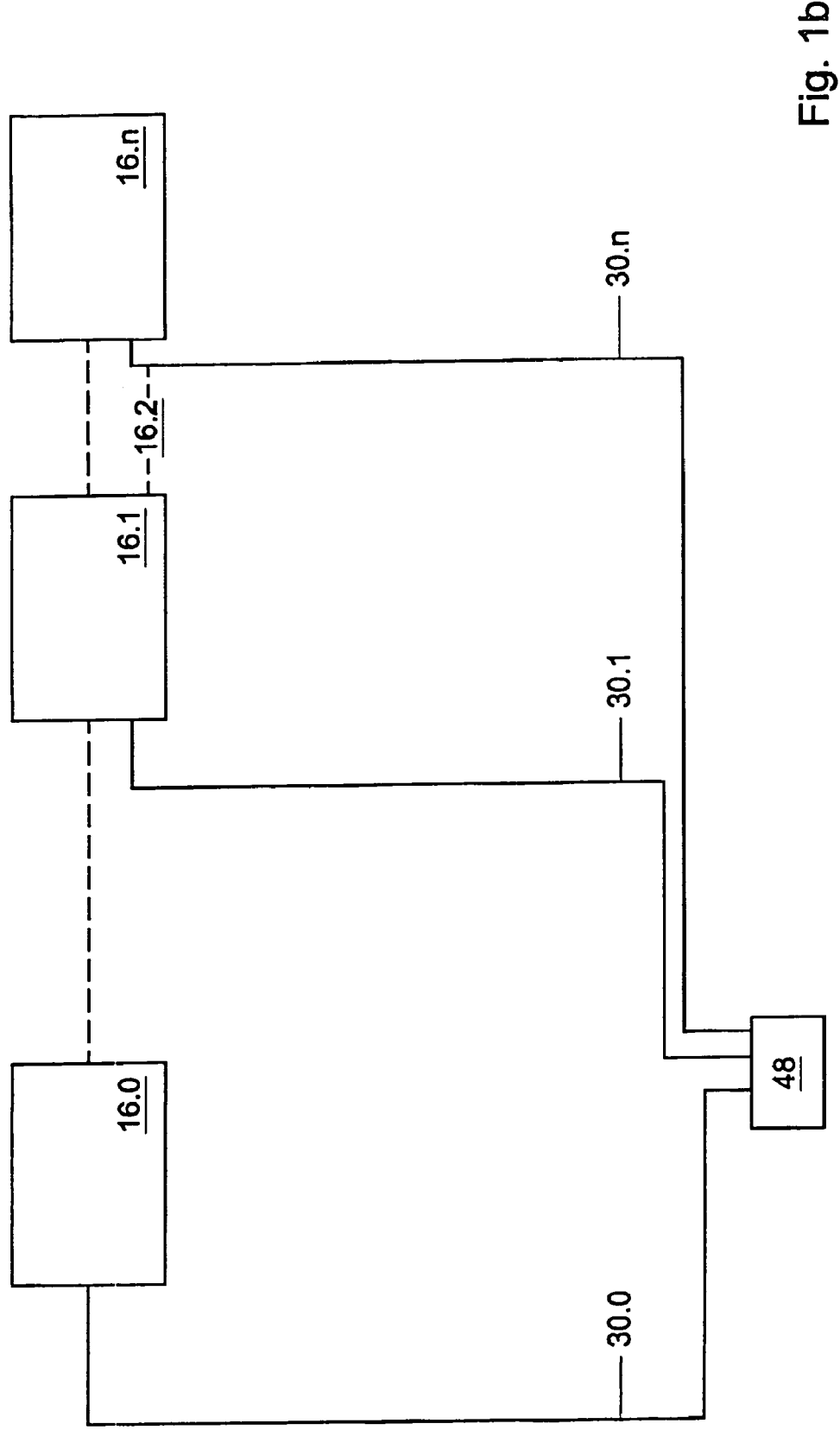
FIG. 1b schematically shows a second possible embodiment of a system according to the invention.

According to FIG. 1*b*, the system further comprises a central control device 48. Both the local control device 26 and the central control device 48 are connected with the communication device 30. $n$ in order that the local control device 26 and the central control device 48 can exchange real-time information, i.e., real-time data, with each other. The communication device 30. $n$ (with N=1, 2,3, . . . ) can consist of a telephone connection, Internet, a wireless connection, etc. In FIG. 1*b*, further, other stores 16.1,16.2, . . . 16. $n$ are indicated. Each of these stores is provided with person and/or goods registration devices, as well as a local control device 26 such as has been discussed in connection with the store 16.0. These local control devices 26 are connected via the communication device 30.1 to 30. $n$ with the central control device 48.

For each of the stores, it holds that the system is adapted for real-time transmission, from the local control device 26 to the central control device 48, of real-time information about the antitheft labels detected by the antitheft system 4, 6. Further, the system is adapted for real-time transmission from the local control device to the central control device of diagnostic information about the operation of the above-mentioned persons and goods identification devices 4, 6, 14, 22, 24. This diagnostic information can also relate to the number of alarms, etc. Naturally, false alarms are to be inputted by hand. This can be done, in this example, at the local control device 26, designed as a computer. The system is also adapted for transmitting from the local control device to the central control device real-time information about the goods registered at the checkout blocks and for transmitting from the central control device to the local control device real-time information for modifying settings of the above-mentioned devices 4, 6, 14, 22, 24 and further for operating these devices. To be considered here is, for instance, adjustment of the sensitivity of the transceiver devices 4, 6, etc.

The system is further adapted for real-time transmission from the local control device to the central control device of real-time information about the registered or identified persons. This involves information obtained by means of the device 14. Also, the system is provided with a plurality of groups of registration devices. In this example, all registration devices included in the store belong to a group. As already set out above, each registration device of a group of the registration devices is connected with a local control device 26.

As will be set out in more detail hereinafter, the central control device is adapted for statistically processing the diagnostic information, the information about the detected antitheft labels, the information about the registered goods and/or the information about the registered or identified goods. It further holds that the system is adapted for group-wise processing the diagnostic information, the information about the detected antitheft labels, the information about the registered goods and/or the information about the registered or identified persons. It also holds that the system is adapted for processing in combination the information obtained per group.

It holds, furthermore, that the system is further adapted for transmitting from the local control device to the central control device information about the identity of a coworker operating a checkout block. In addition, it holds that the system is further adapted for transmitting information about the location of a group from the local control device to the central control device.

Figure 2:
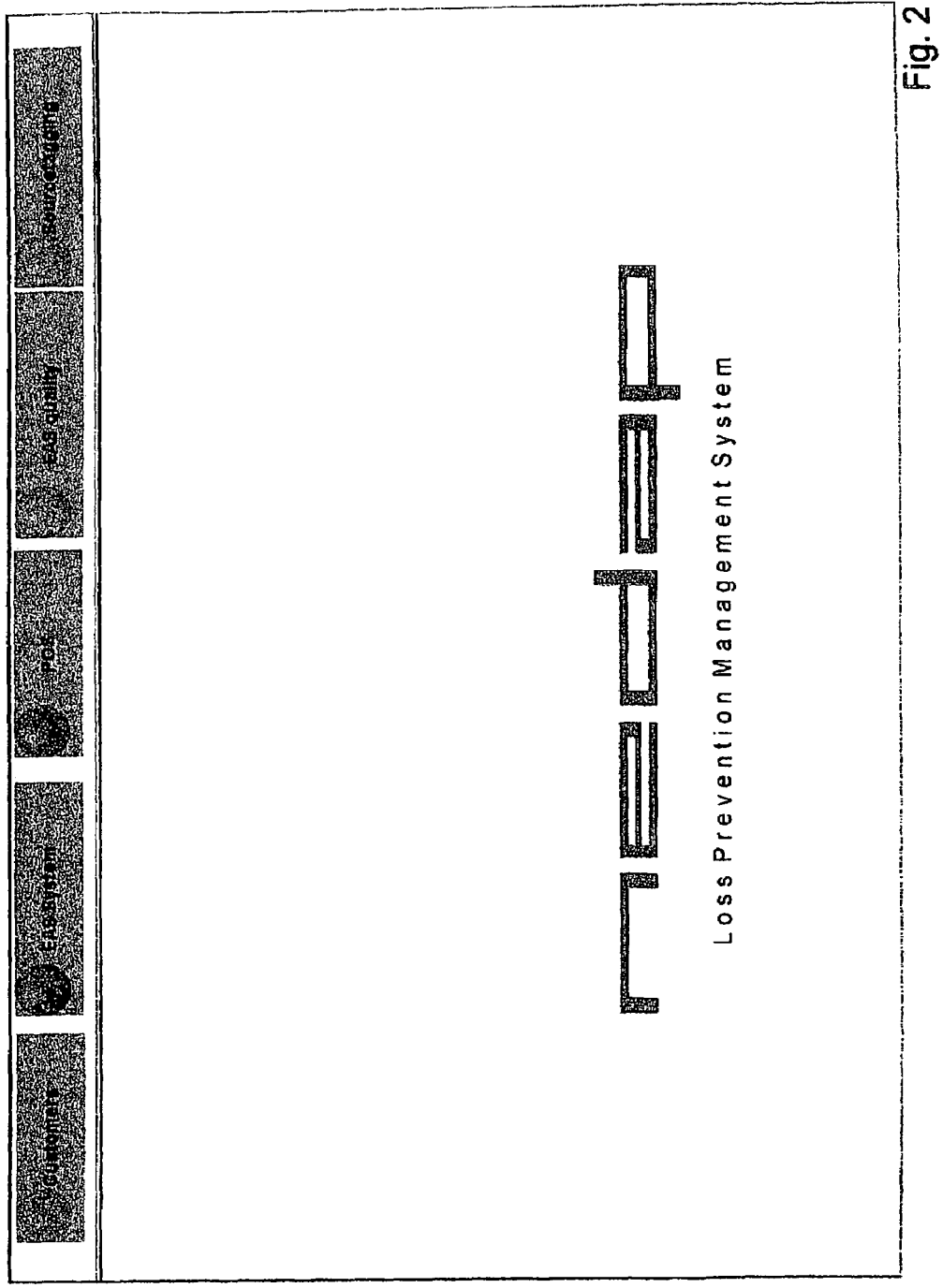
Figure 3:
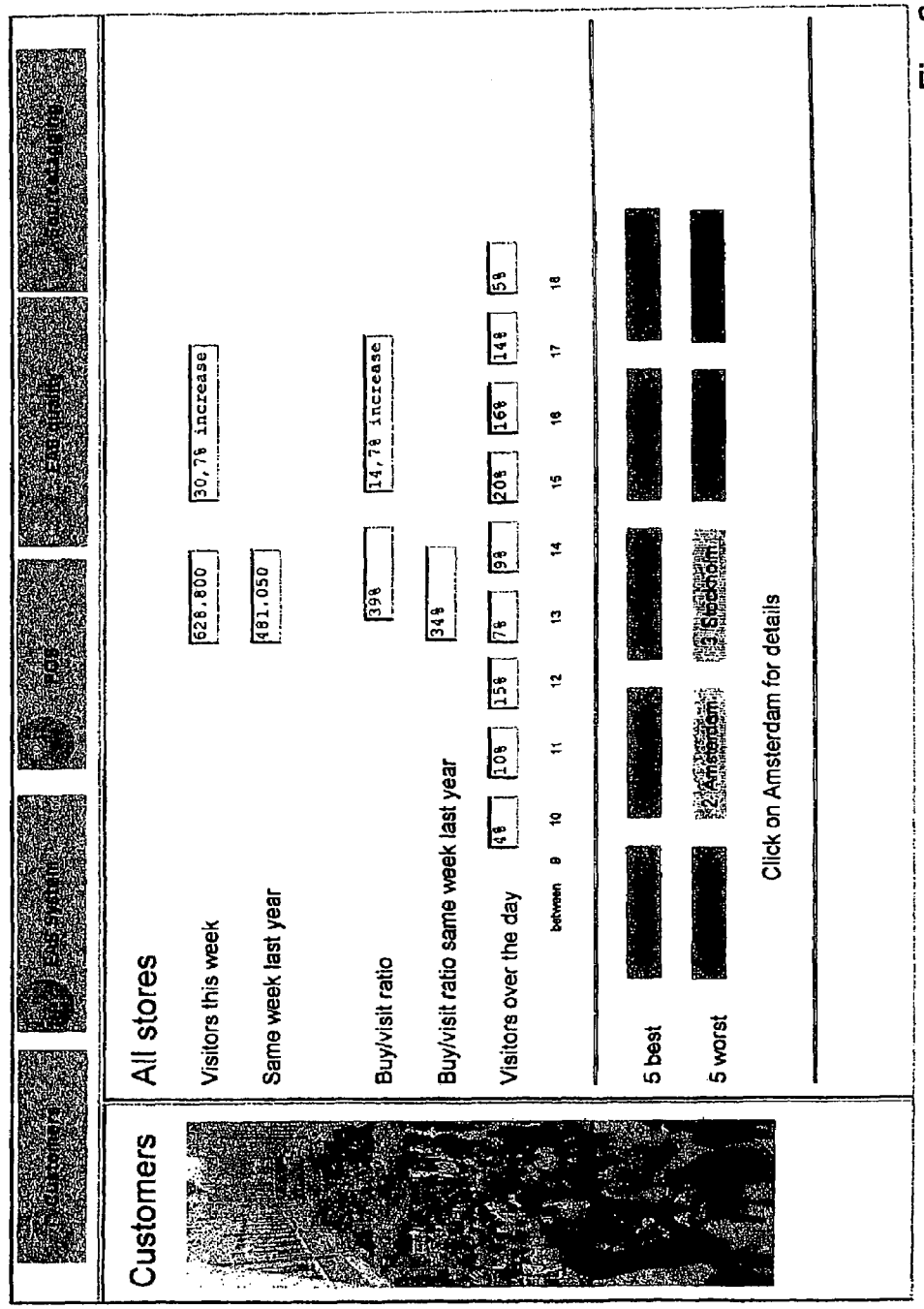

The above-mentioned measures have as a consequence that the central control device comprises a display, the system being designed such that at least the following images can be shown on the display. FIG. 2 shows a first image. FIG. 2 shows a menu where, for instance with a mouse, respective icons Customers, EAS system (Electronic Antitheft System), POS (Point-of-Sale), EAS quality and Sourcetagging can be selected. If by means of the mouse the icon Customers is activated, FIG. 3 appears on the screen. FIG. 3 shows inter alia all customers who have visited the stores 16.0 to 16.*n* this week. These customers have been registered by the transceivers 4, 6, which, in this example, are additionally adapted such that they can register a person who enters the store via the passage 8 or 10. Thus 628,800 persons have been registered. The same week last year (see FIG. 3), 481,050 persons were registered. On the screen it is accordingly indicated that an increase of 30.7% is involved. Also indicated on the screen is how many of the visits are in effect converted into a transaction. The buy/visit ratio indicates 39%. This information can be obtained on the basis of the articles scanned at the checkout block and in combination with the persons who entered the store, registered at the passages 8, 10. Also indicated is the corresponding buy/visit ratio for the same week last year, which was 34%. Accordingly, an increase of 14.7% is involved. In this example, the store is open from 09.00 to 18.00 hours. At what time spread over the day the customers enter the store is also indicated in percentages, in 'Visitors over the day'.

This example involves stores inter alia in London, Madrid, Paris, Brussels, Berlin, Vienna, Cairo, Amsterdam, Stockholm, etc. The five stores that sold best are indicated in the upper row, while the five stores that sold worst are indicated in the lower row. Newcomers in a row can be indicated by means of colors. In this example, Amsterdam and Stockholm are represented in a different manner, which means that these are new in the row of five worst stores.

Figure 4:
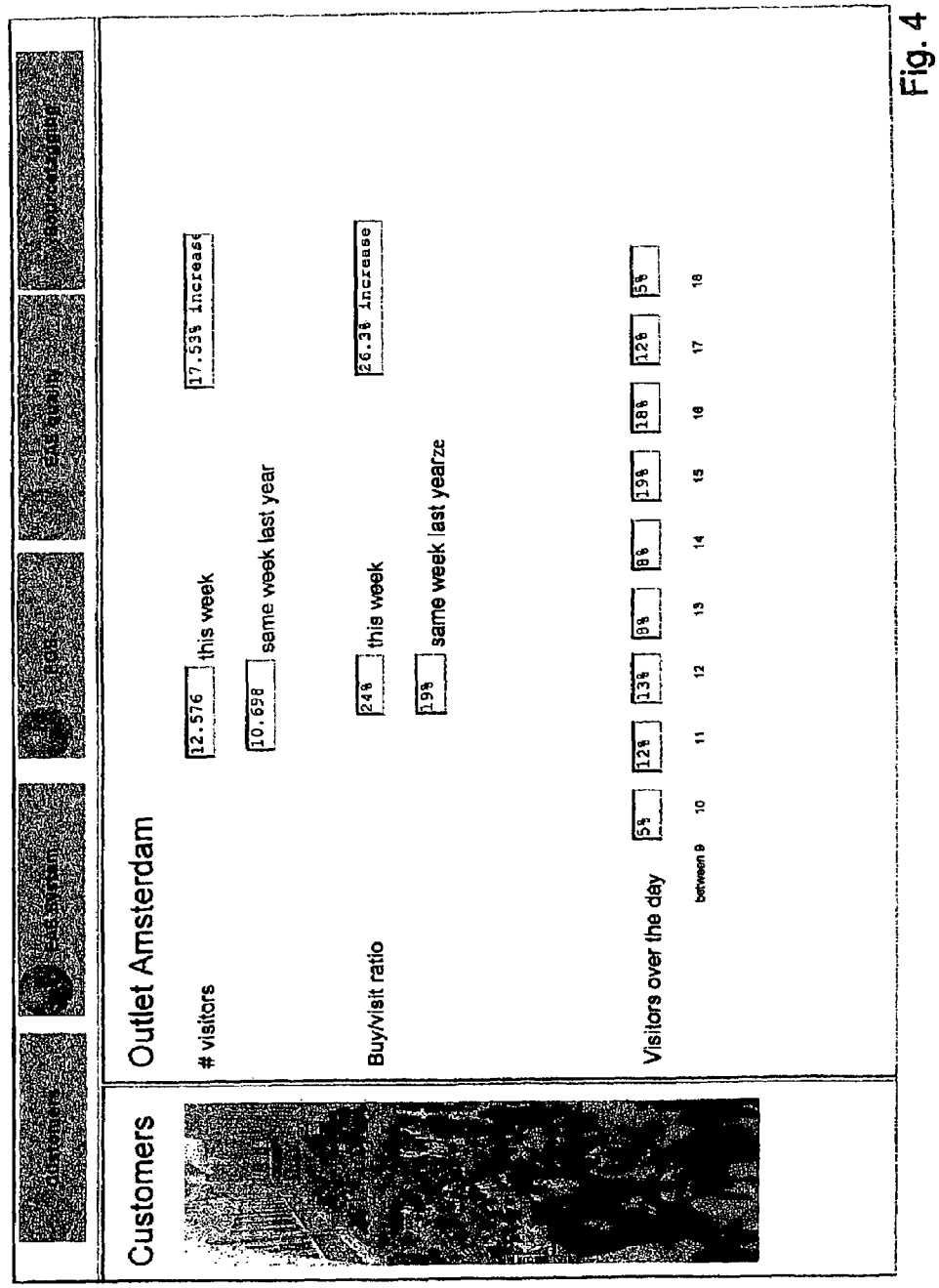

When subsequently clicking on, for instance, Amsterdam with the mouse, the screen according to FIG. 4 appears, in which further information is shown regarding the store in Amsterdam about the number of visitors, the buy/visit ratio discussed earlier, and the percentage of the total number of visitors spread over the day.

Figure 5:
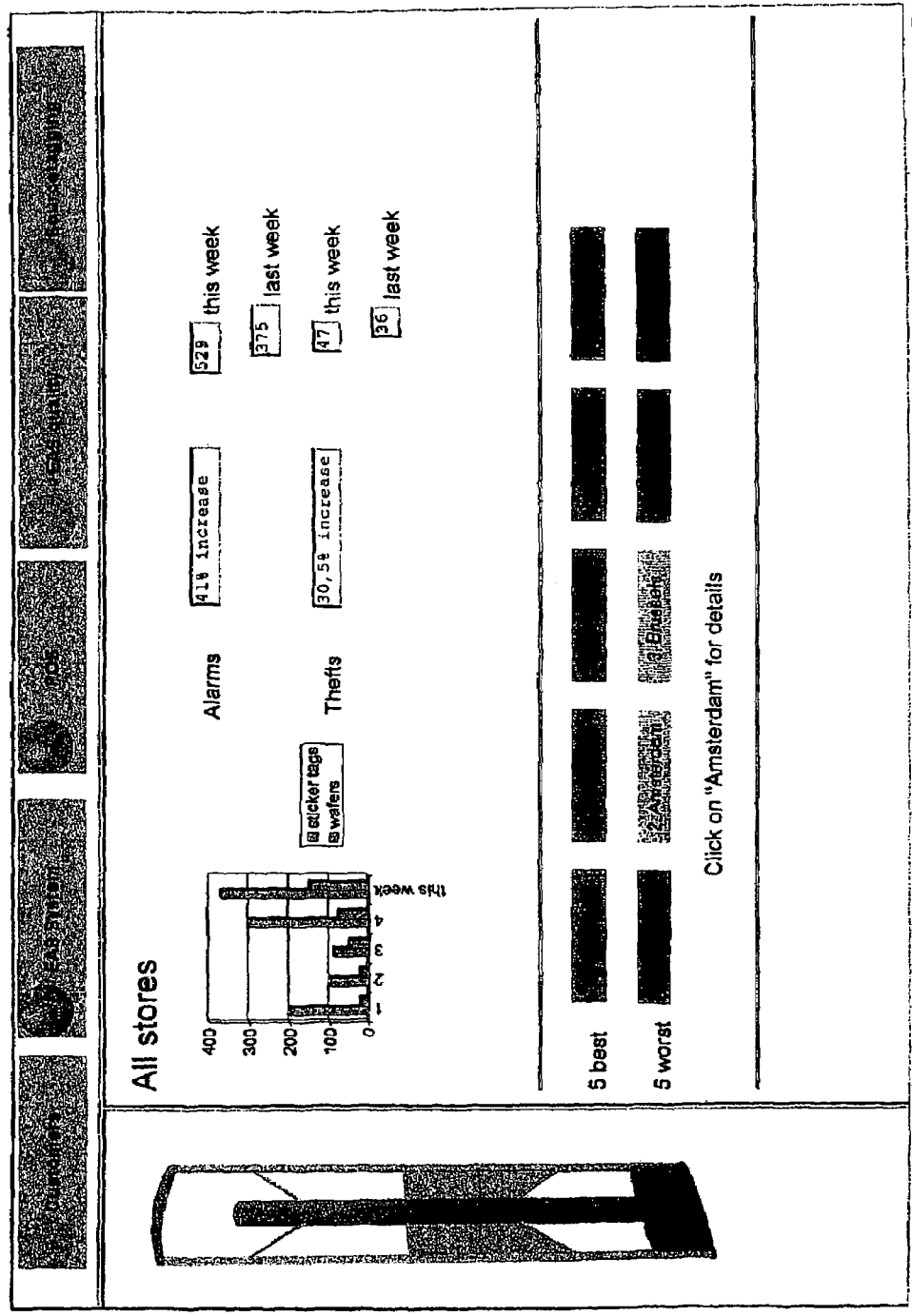

When in the screen of FIG. 2 the icon EAS system is energized by means of the mouse, the screen according to FIG. 5 appears. For all stores, this screen shows real-time the number of alarms caused by antitheft labels and the number of actual thefts of goods. In a bar diagram a distinction is made between alarms caused by a so-called sticker tag and alarms caused by a wafer. This distinction can be carried out in an automatic manner when, for instance, the sticker tag has a different resonance than the wafer. In the example of the bar diagram, the number of alarms is indicated not only for this week but also for the four preceding weeks. Further, as said, a distinction is made between the number of alarms and the number of thefts. This last information must be inputted manually by a coworker when, upon an alarm, he has established whether theft is involved. This data can be inputted manually at the local control device 26. As is clear, both the number of alarms of this week and the number of alarms of the week before is indicated. Also indicated is the rise in the number of alarms. The same holds for the number of thefts.

Figure 6:
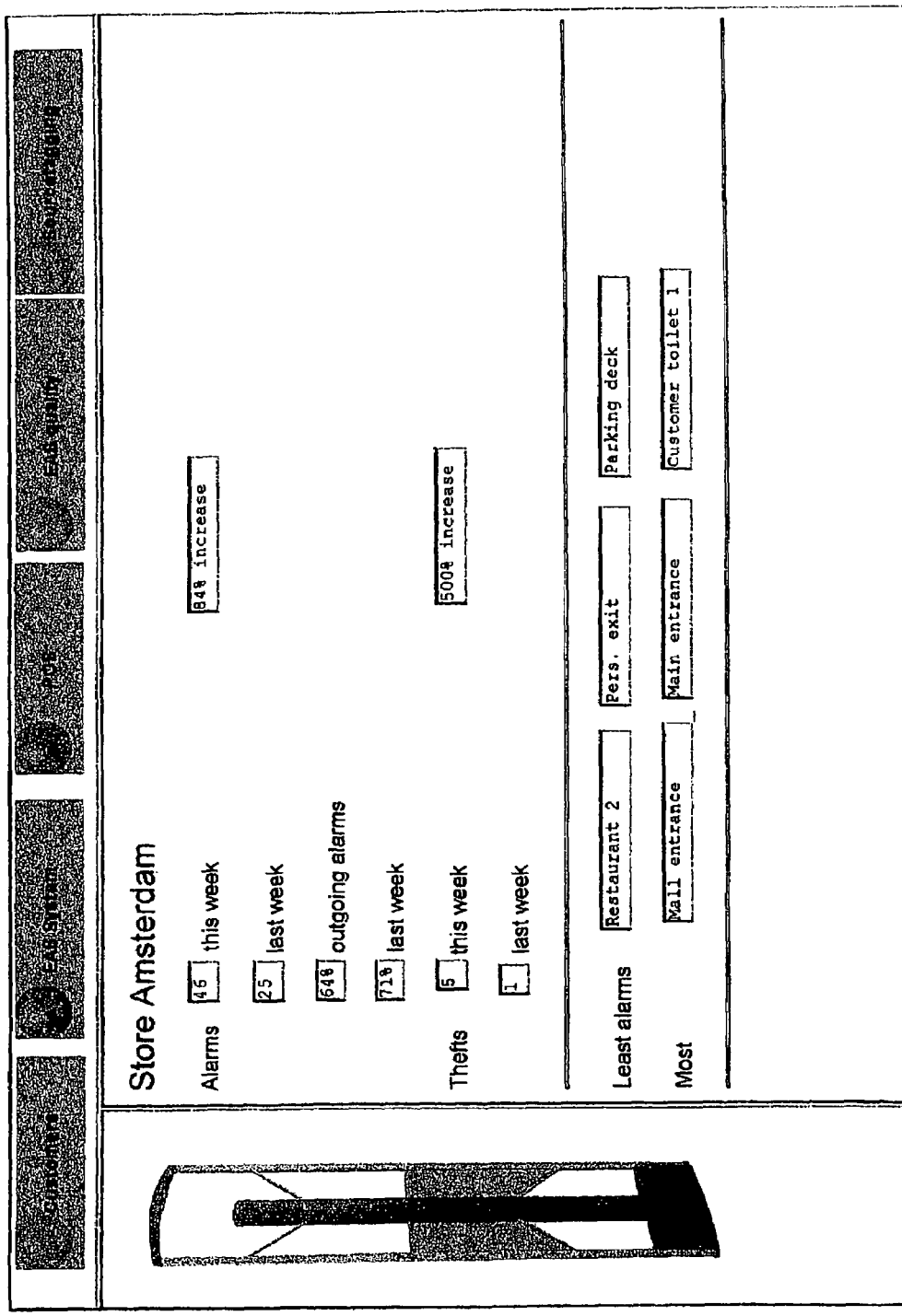

Indicated furthermore in FIG. 5 are the five best stores, i.e., where according to a predetermined criterion the least number of alarms and thefts occur. Also indicated are the five worst stores, where, according to a predetermined criterion, apparently most alarms and thefts occur. The newcomers among the five worst stores in this case are Amsterdam and Brussels, colored differently. When by means of the mouse for instance the icon Amsterdam is clicked, the screen of FIG. 6 appears. FIG. 6 shows the number of detected antitheft labels. Thus, it appears that in the current week, there have been 46 alarms. In the week before, there were 25 alarms. It also appears that the number of alarms that was due to a customer leaving the store was 64% of the total number of alarms. To be able to distinguish between incoming and outgoing alarms, a coworker should enter at the local control device 26 in respect of each alarm whether it went off for a customer entering the store or one leaving the store. It is further indicated to what extent the number of alarms this week is higher compared with last week. A 84% increase is involved here. Naturally, an alarm does not necessarily involve theft. Against 'thefts' it is indicated that there were five thefts this week and one theft last week. This, too, cannot be indicated until a coworker has checked whether theft is actually involved. The information in question is again entered manually at the local control device 26. In this example, the store can have a number of passages. Thus, the store can have a passage adjacent a restaurant, a passage for the personnel, a passage to parking facilities, etc. On the screen, it is then also indicated at which passages the least number of alarms are caused and at which passages most alarms are caused. Naturally, this means that at each of these passages a security device 4,6 is disposed.

Figure 7:
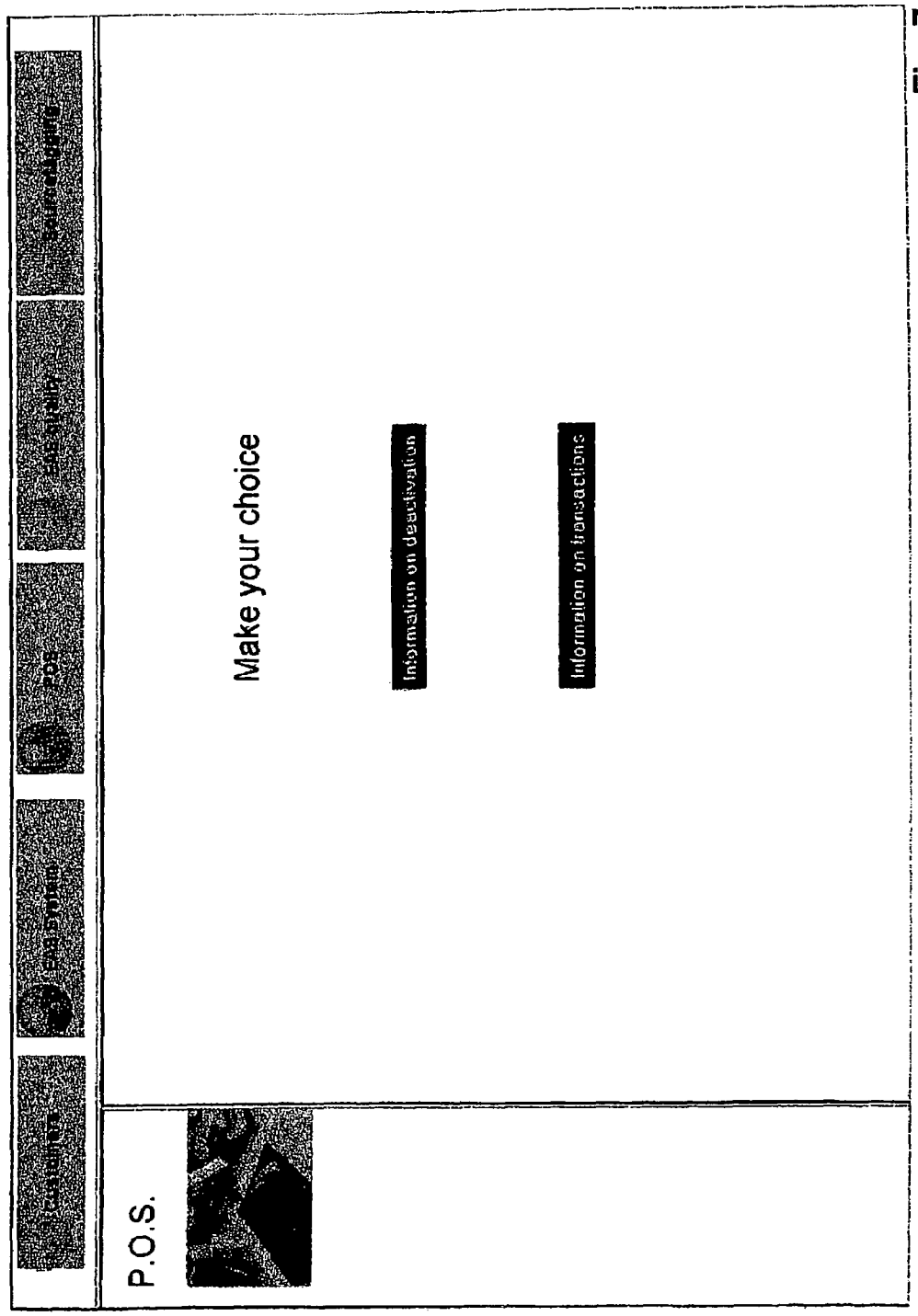
Figure 8:
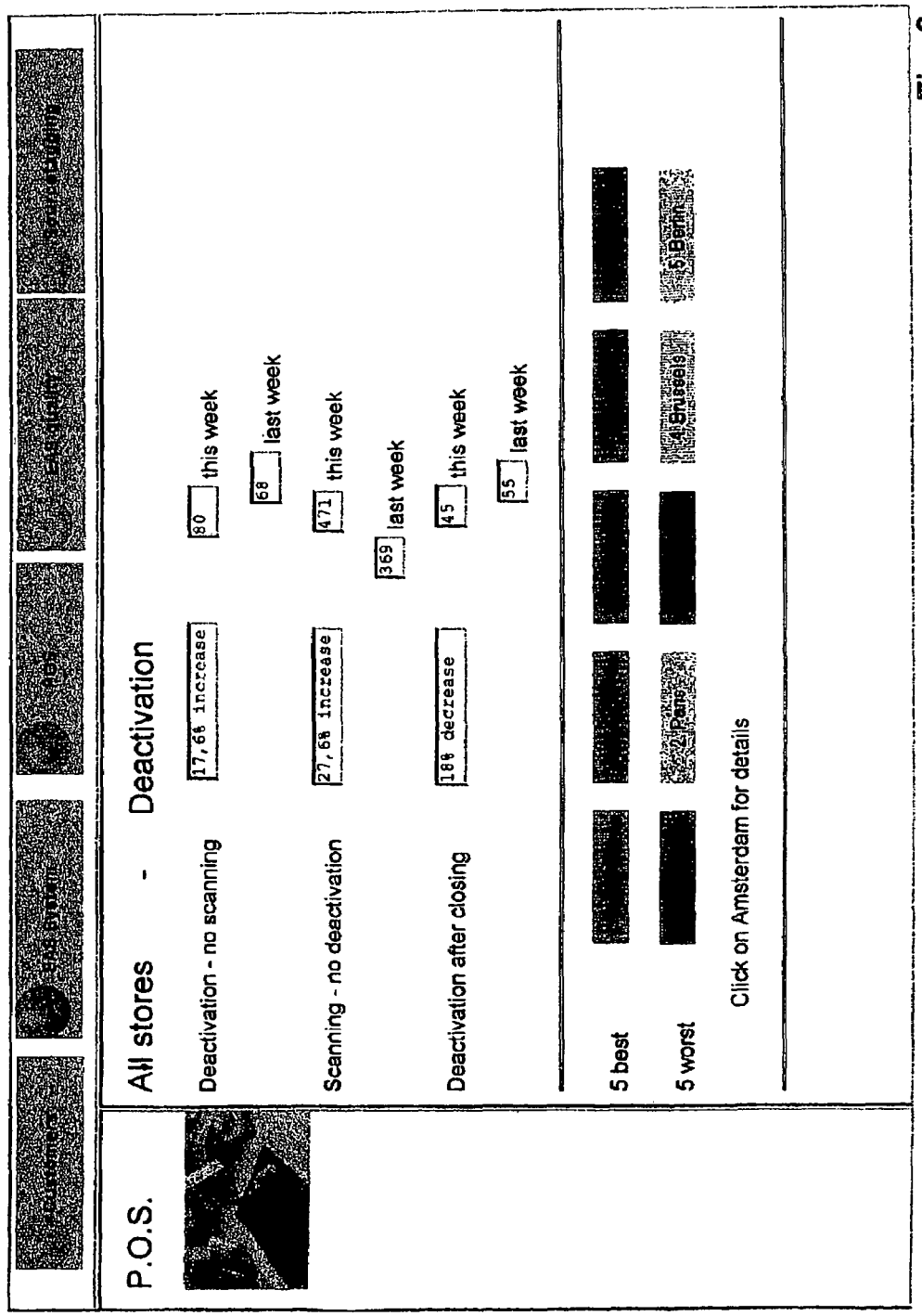
Figure 9:

When in the menu of FIG. 2 the icon POS is energized, the screen according to FIG. 7 is depicted. In this screen, two choices can be made, viz. 'Information on deactivation' and 'Information on transaction'. When 'Information on deactivation' is energized, the screen of FIG. 8 appears. In this screen, it is shown for all stores together that this week 80 goods have been deactivated but not scanned. Possibly, therefore, these 80 goods have been misappropriated by coworkers. It is also indicated that in the week before, this happened only 68 times. Accordingly, a 17.6% increase is involved, as is clearly shown. The screen also shows the number of cases in which goods have been scanned without being deactivated. That no deactivation has taken place can be derived on the basis of the number of alarms AT THE entrance. Thus, it appears that in this week, this has occurred 471 times, compared with 369 times in the week before. It is indicated that a 27.6% increase is involved. When a commodity is scanned but not deactivated, this can point to failure on the part of a coworker, failure of a deactivation device, etc. It is further also indicated when goods are deactivated after closing time 'deactivation after closing'. This may point to possibly fraudulent acts on the part of coworkers. It appears that this happened 45 times this week, and 55 times last week, a decrease of 18%. Also, in an upper row the five best stores according to a predetermined-criterion are designated again and in a lower row the five worst stores according to a predetermined criterion. By clicking on one of the stores again, detail detailed information about the store in question can be obtained. When thus the icon Amsterdam is energized, the screen according to FIG. 9 appears. For the Amsterdam store, the number of times of 'deactivation no scanning' is indicated for this week and the week before. There proves to be a 50% increase. Also indicated is an identification number of a coworker (529-1489), against which the number of times that he or she has deactivated without scanning this week (4 times) and the week before (3 times). Similarly, this is indicated for a coworker having identification number 529-0251.

Also, again for the Amsterdam store, the number of times of 'scanning—no deactivation' for this week and last week is indicated. These numbers are likewise specified per coworker, in this case for the coworker having the identification number 529-8219, and for the coworker having the identification number 529-6331. Also indicated for the Amsterdam store is the number of deactivations after closing time: 7 this week and 5 last week. This time a 40% increase is involved, as is also indicated. It is also indicated again per coworker how many goods he has deactivated this week and last week after closing time.

Figure 10:
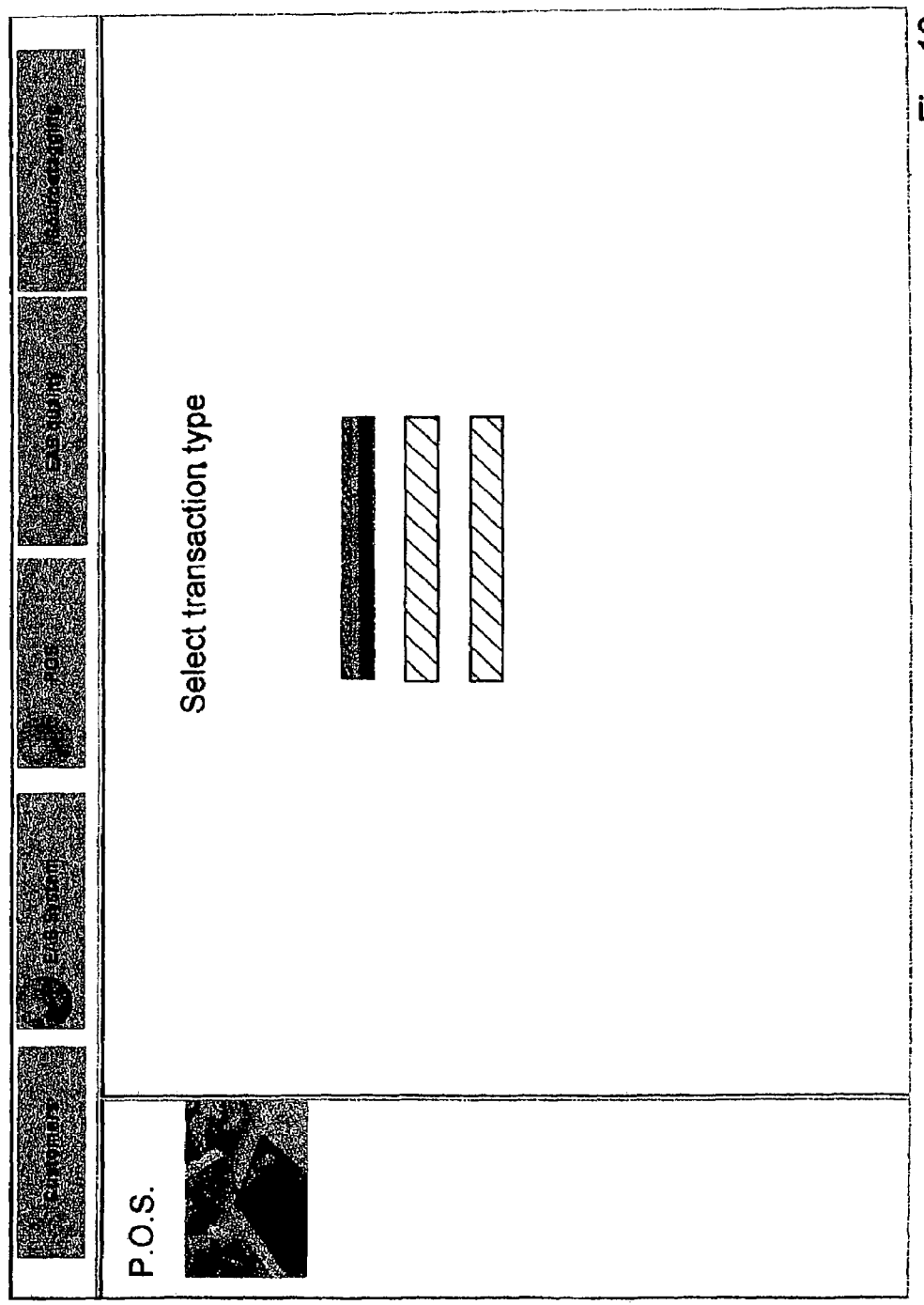

When in FIG. 7 'Information on transactions' is selected, the screen according to FIG. 10 appears. Again, a number of icons are visible, which in this example are indicated through bars which can be energized to select particular types of transactions. Thus a distinction can be made between goods which have been paid for at the checkout in cash, via a pin code, with a credit card, etc. It can also be established per store, per checkout and/or per coworker whether goods have been taken back, etc. Such possibilities can each be further analyzed under 'select transaction type'.

Figure 11:
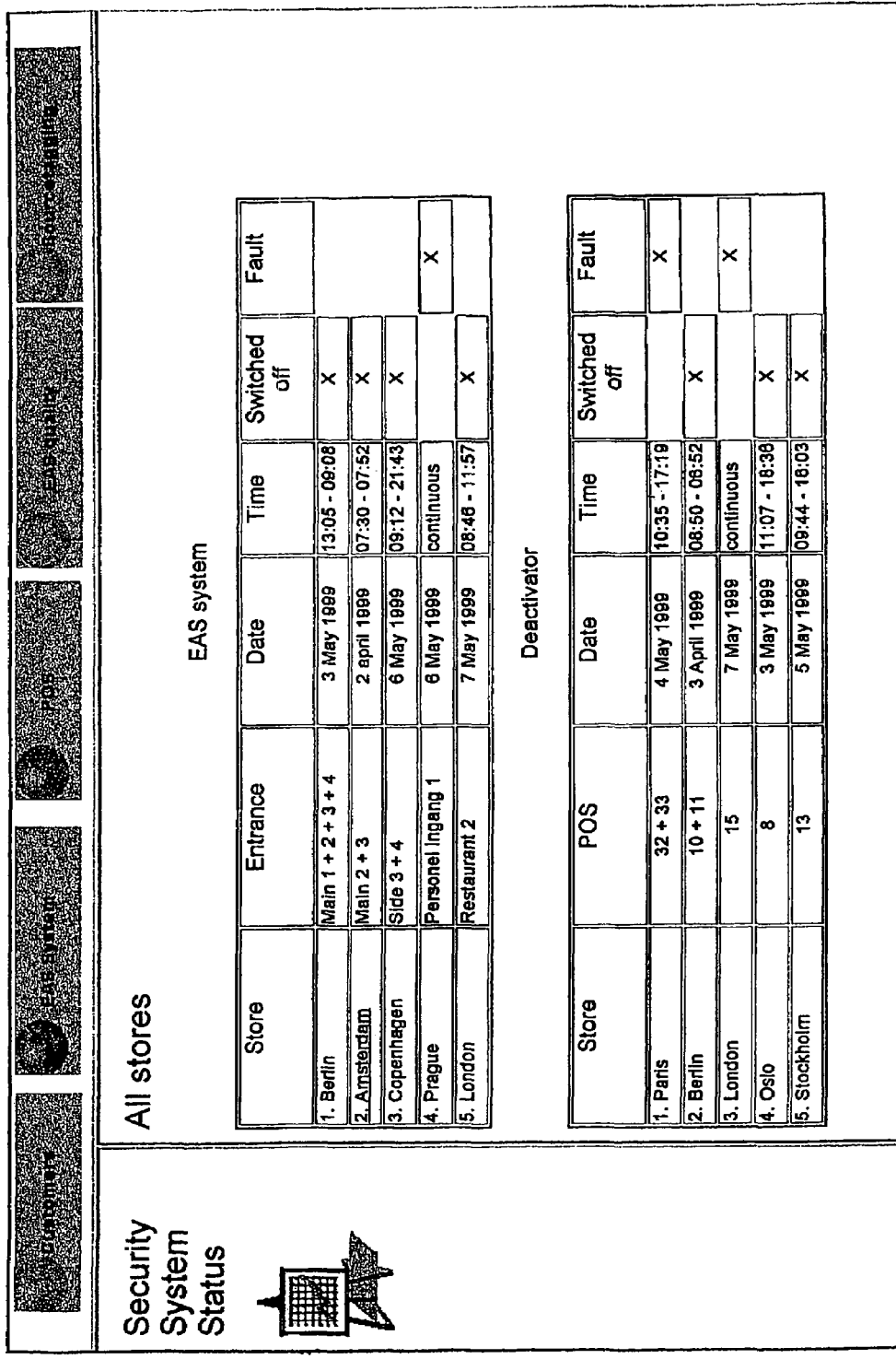

When in FIG. 2 the icon 'EAS quality' is energized, the screen according to FIG. 11 is shown. In this screen, per store, various information is shown, in this example about the theft security system. Thus, for the Berlin store, on May 3, 1999 from 1.05 p.m to 9.05 p.m. the system in question appears to have been switched off for the entrances 1, 2, 3 and 4. For Prague, it appears that on May 6, 1999, the person identification device 14 at the entrance 12 was defective all day.

Also, a table has been included for the deactivation devices 30,32 of the checkouts. Thus in Paris at checkouts numbered 32,33 on May 4, 1999 from 10.35 a.m. to 5.19 p.m. the deactivation device was defective. It also appears, for instance, for Oslo, that the checkout number 8 was switched off from 11.07 a.m. to 6.36 p.m on May 3, 1999.

When in FIG. 2, finally, the icon 'sourcetagging' is energized, the screen according to FIG. 12 appears.

It is often agreed with suppliers of products that they provide, for instance, 75% of their products with an identification label. For Adidas shirt 'Agassi' with product code 71632415, this is 75% as shown in FIG. 12, based on information from the checkout blocks 22, 24. This information consists, for instance, of a scanned product code 71632415. Also, it is then inputted at the checkout whether the product in question is found to have an antitheft label. In this case, it is found that 34% of the scanned products with product code 71632415 are provided with such a label. FIG. 12 accordingly makes clear that this is far below the required level agreed upon with the supplier. This can be a reason to contact the supplier. For other products with other product codes, similar information is shown on the screen according to FIG. 12.

The invention is not limited in any way to the above-outlined exemplary embodiments. Thus, screens may be shown on the basis of which by means of mouse operations and the like settings of the various devices can be changed, devices can be switched on and off, etc. It is also possible by means of the central control device 28 to control the registration devices in question remotely. It is also possible to determine the system configuration remotely. This can here involve the number of antennas, the type of antenna and the width of a passage. It is also possible to change settings of a system remotely. To be considered here are the sensitivity of the detection at a passage, optimizing the system for detecting particular types of labels, setting the length of a period during which a lamp of a theft security system continues to burn when an alarm goes off, etc. Also, such lamps, alarms and the like can be checked remotely. It is even possible via the central control device to download updates of software to the local control device, which updates may thereupon be remotely implemented in the theft security system, the checkout block, the person identification and registration system, etc. Also, the above-discussed information transmitted from the local control devices to the central control device can be processed in combination for obtaining alarm trends, profiles, etc. It will be clear that on a screen coupled to a local control device information can be shown according to a format analogous to the format as discussed above for the central control system. Naturally, the information on the local systems applies primarily only for information coming from the local system.

The term identification code also relates to a system provided with a local control device without this being provided with explicitly provided identification codes because it is inherently known what systems are involved in this case. The term identification code also encompasses the individual connections between the systems and the control device. With the system, in all cases, the number of detections of antitheft labels per unit time or per predetermined period can be updated real-time, thus enabling real-time intervention when, for instance, a predetermined threshold value, adjustable according to circumstances, has been exceeded. This information can be disclosed at the local control device and/or the central control device in a manner known per se. The threshold value can be set per antitheft system and even per transceiver device. When a large number (or too large a number) of antitheft labels are being detected, this can then be brought real-time to the attention of the coworkers on, for instance, checkout blocks from the local and/or central control device. What matters primarily is that the number is real-time registrable and transmittable to management. However, as discussed, the system can also be equipped with possibilities of registering goods and persons. This is understood to include cameras, with which real-time a situation around a detection system is observed. Such variants are all understood to fall within the scope of the invention.

The invention claimed is:

1. A system comprising
at least one theft security system including at least one transceiver device disposed adjacent at least one passage for detecting antitheft labels passing through the passage,
at least one central control device and at least one communication device,
each theft security system being provided with an identification code with which each theft security system is identifiable,
a plurality of local control devices with each local control device being connected via one of the communication devices to one of the theft security systems adjacent the local control device,
each communication device being arranged for real-time transmission of real-time information about detected antitheft labels for which an alarm is generated from the theft security systems to the adjacent local control device,
each local control device being arranged for real-time processing of the real-time received real-time information, the central control device being arranged for further processing real-time information about detected antitheft labels coming from the local control device so that theft security system real-time information is obtained about a number of detected antitheft labels,
the central control device including an information representing unit for making known real-time the information about the number of detected antitheft labels, and when the number of detected antitheft labels per unit time exceeds a predetermined threshold value.

2. The system according to claim 1, further comprising a goods registration device including at least one of a person registration system disposed adjacent at least one passage for one of identifying and counting persons who pass the passage and at least one checkout block for one of counting and identifying goods to be checked out by scanning and for deactivating or removing antitheft levels attached to the goods, and each of the communication devices being further adapted for real-time transmission of real-time information from the goods registration device, the person registration system, and each checkout block to the adjacent local control device.

3. The system according to claim 2, wherein the goods registration device, the person registration system, and the checkout block are provided with an identification code with which the goods registration device, the person registration system, and the checkout block and the information from the goods registration device, person registration system, and the checkout block are identifiable.

4. The system according to claim 1, further comprising manual input and real-time transmission of information regarding antitheft labels attached to paid-for goods.

5. The system according to claim 1, wherein the real-time transmission of real-time information is made about defects in one of the devices.

6. The system according to claim 1, wherein the central control device is provided with one of analysis and statistical processing programs.

7. The system according to claim 1, wherein the central control device is provided with software programs to process information.

8. The system according to claim 1, wherein at least one local control device is adapted for controlling at least one of an adjacent theft security system and an adjacent transceiver device real-time.

9. A system comprising
at least one theft security system including at least one transceiver device disposed adjacent at least one passage for detecting antitheft labels passing the passage,
at least one central control device and at least one communication device, each theft security system being provided with an identification code with which each theft security system is identifiable, a plurality of local control devices with each local control device being connected via one of the communication devices to one of the theft security systems adjacent the local control device, each communication device being arranged for real-time transmission of real-time information about detected antitheft labels for which an alarm is generated from the theft security systems to the adjacent local control device, each local control device being arranged for real-time processing of the real-time received real-time information, the central control device being arranged for further processing real-time information about detected antitheft labels coming from the local control device so that theft security system real-time information is obtained about a number of detected antitheft labels, the theft security system real-time information being transmitted to also identify a coworker.

10. A system comprising at least one theft security system including at least one transceiver device disposed adjacent at least one passage for detecting antitheft labels passing the passage, at least one central control device and at least one communication device, each theft security system being provided with an identification code with which each theft security system is identifiable, a plurality of local control devices with each local control device being connected via one of the communication devices to one of the theft security systems adjacent the local control device, each communication device being arranged for real-time transmission of real-time information about detected antitheft labels for which an alarm is generated from the theft security systems to the adjacent local control device, each local control device being arranged for real-time processing of the real-time received real-time information, the central control device being arranged for further processing real-time information about detected antitheft labels coming from the local control device so that theft security system real-time information is obtained about a number of detected antitheft labels, the central control device being adapted to control each theft security system in real-time.

11. A system comprising at least one theft security system including at least one transceiver device disposed adjacent at least one passage for detecting antitheft labels passing the passage, at least one central control device and at least one communication device, each theft security system being provided with an identification code with which each theft security system is identifiable, a plurality of local control devices with each local control device being connected via one of the communication devices to one of the theft security systems adjacent the local control device, each communication device being arranged for real-time transmission of real-time information about detected antitheft labels for which an alarm is generated from the theft security systems to the adjacent local control device, each local control device being arranged for real-time processing of the real-time received real-time information, the central control device being arranged for further processing real-time information about detected antitheft labels coming from the local control device so that theft security system real-time information is obtained about a number of detected antitheft labels, and a goods registration device comprising at least one person registration system disposed adjacent at least one passage for one of identifying and counting persons who pass the passage and at least one checkout block for one of counting and identifying goods to be checked out by scanning and for deactivating or removing antitheft levels attached to the goods, each of the communication devices being further adapted for real-time transmission of real-time information from the goods registration device, the person registration system, and each checkout block to the adjacent local control device, and at least one of each local control device and the central control device being adapted for controlling the goods registration device, the person registration system, and the at least one checkout block.

12. A system comprising at least one theft security system including at least one transceiver device disposed adjacent at least one passage for detecting antitheft labels passing the passage, at least one central control device and at least one communication device, each theft security system being provided with an identification code with which each theft security system is identifiable, a plurality of local control devices with each local control device being connected via one of the communication devices to one of the theft security systems adjacent the local control device, each communication device being arranged for real-time transmission of real-time information about detected antitheft labels for which an alarm is generated from at least one of the theft security systems to the adjacent local control device, each local control device being arranged for real-time processing of the real-time received real-time information, the central control device being arranged for further processing real-time information about detected antitheft labels coming from the local control device so that theft security system real-time information is obtained about a number of detected antitheft labels, and a goods registration device comprising at least one person registration system disposed adjacent at least one passage for one of identifying and counting persons who pass the passage and at least one checkout block for one of counting and identifying goods to be checked out by scanning and for deactivating or removing antitheft levels attached to the goods, and each of the communication devices being further adapted for real-time transmission of real-time information from the goods registration device, the person registration system, and each checkout block to the adjacent local control device, and the central control device being adapted for controlling the goods registration device, the person registration system, and the at least one checkout block.

13. A system comprising
a theft security system including at least one transceiver device set up at a passage for detecting antitheft labels passing through the passage,
at least one of a person identification system and a person registration system set up at a passage for one of registering and identifying persons who pass through the passage, and
a checkout block for registering goods to be checked out by scanning and for one of deactivating and removing antitheft labels attached to the goods,
a central control device connected with a local control device for providing a communication connection between the central control device and the local control device, where the central control device is connected with the local control device for exchanging data between the local control device and the central control device and for transmitting from the local control device to the central control device at least one of (a) diagnostic information, (b) information about detected antitheft labels, (c) information about the registered goods, and (d) information about the registered or identified persons,
a plurality of registration devices, each registration device being connected with the local control device,
the central control device being adapted for statistically processing at least one of (a) diagnostic information, (b) information about the detected antitheft labels, (c) information about the registered goods, and (d) information about the registered or identified persons, and at least one of (a) the diagnostic information, (b) the information about the detected antitheft labels, (c) the information about the registered goods and (d) the information about the registered or identified persons per group being processed and information being transmitted, as a result, from the central control device to the local control device for changing at least one of settings and operation of the local control device.

14. The system according to claim 13, wherein information is transmitted about a location of a group from the local control device to the central control device.

15. A system comprising
a theft security system including at least one transceiver device set up at a passage for detecting antitheft labels passing through the passage,
at least one of a person identification system and a person registration system set up at a passage for one of registering and identifying persons who pass through the passage, and
a checkout block for registering goods to be checked out by scanning and one of deactivating and removing antitheft labels attached to the goods,
a central control device connected with a local control device for providing a communication connection between the central control device and the local control device, where the central control device is connected with the local control device for exchanging data between the local control device and the central control device and for transmitting from the local control device to the central control device (a) diagnostic information, (b) information about detected antitheft labels, (c) information about the registered goods, and (d) information about the registered or identified persons,
a plurality of registration devices, each registration device being connected with the local control device,
the central control device being adapted for statistically processing at least one of (a) diagnostic information, (b) information about the detected antitheft labels, (c) information about the registered goods, and (d) information about the registered or identified persons, and (a) the diagnostic information, (b) the information about the detected antitheft labels, (c) the information about the registered goods and (d) the information about the registered or identified persons per group being processed and information being transmitted from each of the local control devices to the central control device about (a) the detected antitheft labels, (b) the diagnostic information about the operation of the at least one device, (c) information about the registered goods, and (d) information for changing one of settings and operation of the local control device.

16. The system according to claim 15, wherein information is transmitted from the local control device to the central control device about one of the registered persons and the identified persons.

17. A system comprising
a theft security system including at least one transceiver device set up at a passage for detecting antitheft labels passing through the passage,
at least one of a person identification system and a person registration system set up at a passage for one of registering and identifying persons who pass through the passage, and
a checkout block for registering goods to be checked out by scanning and one of deactivating and removing antitheft labels attached to the goods,
a central control device connected with a local control device for providing a communication connection between the central control device and the local control device, where the central control device is connected with the local control device for exchanging data between the local control device and the central control device and for transmitting from the local control device to the central control device (a) diagnostic information, (b) information about detected antitheft labels, (c) information about the registered goods, and (d) information about the registered or identified persons,
a plurality of registration devices, each registration device being connected with the local control device,
the central control device being adapted for statistically processing at least one of (a) diagnostic information, (b) information about the detected antitheft labels, (c) information about the registered goods, and (d) information about the registered or identified persons, and (a) the diagnostic information, (b) the information about the detected antitheft labels, (c) the information about the registered goods and (d) the information about the registered or identified persons per group being processed and information being transmitted from each of the local control devices to the central control device about an identity of a coworker which operates the checkout block.

* * * * *